United States Patent [19]

Fivizzani

[11] Patent Number: 5,192,447
[45] Date of Patent: Mar. 9, 1993

[54] USE OF MOLYBDATE AS A COOLING WATER CORROSION INHIBITOR AT HIGHER TEMPERATURES

[75] Inventor: Kenneth P. Fivizzani, Naperville, Ill.

[73] Assignee: Nalco Chemical Company, Naperville, Ill.

[21] Appl. No.: 727,413

[22] Filed: Jul. 9, 1991

[51] Int. Cl.$^5$ .................... C23F 11/167; C02F 5/14
[52] U.S. Cl. .................... 210/697; 210/699; 210/700; 210/701; 422/15; 422/16; 422/17; 422/18; 422/19; 252/181; 252/389.2; 252/389.21; 252/389.52; 252/389.53; 252/389.54; 252/390
[58] Field of Search ............... 210/697, 698, 699, 700, 210/701; 422/7, 15, 16, 17, 18, 19; 252/389.2, 389.21, 389.22, 389.52, 389.53, 389.54, 389.23, 390, 180, 181

[56] References Cited

U.S. PATENT DOCUMENTS

| | | | |
|---|---|---|---|
| 4,217,216 | 8/1980 | Lipinski | 210/700 |
| 4,446,028 | 5/1984 | Becker | 210/700 |
| 4,640,793 | 2/1987 | Persinski et al. | 210/700 |
| 4,744,949 | 5/1988 | Hoots et al. | 210/699 |
| 4,784,774 | 11/1988 | Amjad et al. | 210/701 |
| 4,806,310 | 2/1989 | Mullins et al. | 210/700 |
| 4,818,506 | 4/1989 | Lin et al. | 210/700 |
| 4,874,527 | 10/1989 | Gill | 210/700 |

Primary Examiner—Stanley S. Silverman
Assistant Examiner—Neil M. McCarthy
Attorney, Agent, or Firm—Laff, Whitesel, Conte & Saret

[57] ABSTRACT

A corrosion inhibitor treatment composition for cooling water systems at elevated temperatures in which no chromate is used is disclosed, comprising a combination of a localized corrosion inhibitor in the form of a salt of molybdenum, vanadium, or tungsten, a reduced level of a general corrosion and scale inhibitor comprising zinc, nickel or a combination thereof, orthophosphate, an organic phosphonate, and a stabilizing agent.

7 Claims, No Drawings

USE OF MOLYBDATE AS A COOLING WATER CORROSION INHIBITOR AT HIGHER TEMPERATURES

BACKGROUND OF THE INVENTION

This invention relates generally to a treatment of water used in recirculating cooling water systems and more particularly to a water treatment composition which effectively controls corrosion and scale formation at elevated temperatures, which does not rely in any way upon chromate and which will allow for a reduction in the required levels of zinc and orthophosphate.

Corrosion occurs when metals are oxidized to their respective ions or insoluble salts. For example, corrosion of metallic iron can involve conversion to soluble iron in a +2 or +3 oxidation state or to formation of insoluble iron oxides and hydroxides. Metal loss from the solubilization of the iron causes the structural integrity of the system to deteriorate over time. Leakage between the water system and process streams can ultimately occur. Also, corrosion contributes to the formation of insoluble salts and the resultant buildup of deposits which impede heat transfer and fluid flow.

Chromate has traditionally been an extremely effective and widely used corrosion inhibitor. During recent years, however, the use of chromate has come under increasing scrutiny due to environmental concerns. In light of this, it is most desirable to develop chromate-free, environmentally acceptable corrosion inhibitors.

Additionally, a developing trend in cooling tower operation is toward higher recirculating water temperatures. The bulk water temperature in certain heat exchangers or reactor jackets reaches 170°-180° F. and does not fall below 130° F., even in the cooling sections of the tower. Scale formation is more extensive at these higher temperatures since calcium and magnesium salts are typically less soluble. However, by reducing the salt concentrations that are added to the treatment composition, solubility will be enhanced. It is therefore also desirable to develop a chromate-free treatment program with lower levels of zinc and orthophosphate ions for corrosion inhibition at higher temperatures.

DETAILED DESCRIPTION OF THE INVENTION

It is therefore the principal object of this invention to provide a new, environmentally acceptable chemical treatment program with reduced salt concentrations which will inhibit corrosion in higher temperature recirculating cooling water systems.

The present invention is directed to a corrosion inhibitor treatment composition for recirculating cooling water systems which does not utilize chromate, requires lower levels of zinc and orthophosphate, and effectively inhibits corrosion at higher temperatures. The corrosion inhibitor treatment composition comprises a combination of a localized corrosion inhibitor and a general corrosion and scale inhibitor as described below, as well as a stabilizing agent.

THE LOCALIZED CORROSION INHIBITORS

The localized corrosion inhibitors that can be used in this invention include the water-soluble salts of molybdenum, vanadium, and tungsten in which the metals have an oxidation state of at least +5 and preferably +6. Generally, the level of localized corrosion inhibitor should lie in the range of about 5 to 70 ppm by weight of the cooling water being treated. More preferably, about 10 to 40 ppm by weight will be used and, most preferably, the level will be maintained at about 20 to 30 ppm.

A preferred localized corrosion inhibitor is a water-soluble salt of molybdenum such as a sodium, potassium or ammonium salt of molybdenum. The most preferred localized corrosion inhibitor is sodium molybdate.

Water-soluble salts of vanadium and tungsten could also be used as localized corrosion inhibitors in the practice of this invention, at levels commensurate with those described for molybdenum.

THE GENERAL CORROSION AND SCALE INHIBITORS

The general corrosion and scale inhibitor used in the invention comprises a combination of zinc and/or nickel with orthophosphate and an organic phosphonate.

Any water-soluble salt of zinc or nickel in which the metal is in the +2 oxidation state can be used. $Zn^{+2}$ is preferred. Convenient sources of the salt include zinc oxide, zinc chloride, and zinc sulfate. One preferred source of $Zn^{+2}$ is zinc oxide.

Zinc is a cathodic inhibitor that needs to be used in conjunction with an anodic inhibitor. Orthophosphate ($o-PO_4$) is the preferred anodic inhibitor.

This invention also requires the use of an organic phosphonate to provide scale and corrosion inhibition in concert with the zinc and molybdenum. 2-phosphonobutane -1,2,4 tricarboxylic acid (PBTC) is preferred.

THE STABILIZING AGENT

A stabilizing agent is used to prevent the zinc or nickel from precipitating out of solution. The stabilizing agent also helps disperse and suspend scale and thereby contributes to the control of scale buildup on heat transfer surfaces.

Anionic polymers are generally suitable stabilizing agents in the practice of this invention. The most preferred stabilizing agents to be used in the treatment composition of the present invention as scale inhibitors and dispersants include terpolymers of acrylic acid, methacrylic acid, and N-tertiary butylacrylamide or homopolymers, copolymers, terpolymers, or the like, which contain at least one mole percent of a randomly repeating or blocked monomer unit having the structure:

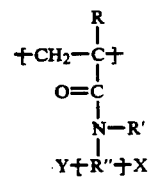

wherein
R is H, $CH_3$, or mixtures thereof;
R' is H, $C_{1-4}$ alkyl, or mixtures thereof;
R" is alkylene (linear) having from 1-16 carbon atoms, or cyclic, aryl, alkaryl, aralkyl, or mixtures thereof
X is sulfonate, phosphonate, phosphite, or mixtures thereof Y is H, —OH, —$NR'_2$, $NR'_3{}^+Z^-$, —$CO_2M$, and mixtures thereof and where Z is an ion, and M is H, alkali cation, alkaline earth cation, ammonium cation, or mixtures thereof.

Tolyltriazole (TT) or benzotriazole may be added to the treatment composition as a corrosion inhibitor for yellow metals. Tolyltriazole is preferred.

The following examples are intended to be illustrative of the present invention and to teach one of ordinary skill how to make and use the treatment composition. These examples are not intended to limit the invention or its protection in any way.

EXAMPLE 1

Three different treatment compositions were prepared to illustrate the ability of a treatment composition containing molybdate and reduced levels of zinc and orthophosphate to effectively inhibit corrosion at 170°–180° F. The treatment compositions were prepared by adding a zinc/orthophosphate component and a polymer component to the test system. The treatment composition of Test 1 was a standard zinc-orthophosphate treatment program containing polymer. Test 2 used the same treatment composition as Test 1 plus an overlay of 30 ppm molybdate anion. Test 3 used one-half the standard zinc-orthophosphate treatment program plus 30 ppm molybdate anion and the same polymer dosage as the other two tests. The actual treatment conditions are recorded in Table 1.

TABLE 1

| Test 1: | 100 ppm zinc-orthophosphate program<br>(2 ppm $Zn^{+2}$, 8 ppm o-$PO_4$, 4 ppm PBTC)<br>150 ppm polymeric stabilizing agent<br>(15 ppm terpolymer*, 4.2 ppm TT) |
|---|---|
| Test 2: | 100 ppm zinc-orthophosphate program<br>(2 ppm $Zn^{+2}$, 8 ppm o-$PO_4$, 4 ppm PBTC)<br>150 ppm polymeric stabilizing agent<br>(15 ppm terpolymer*, 4.2 ppm TT)<br>30 ppm molybdate |
| Test 3: | 50 ppm zinc-orthophosphate program<br>(1 ppm $Zn^{+2}$, 4 ppm o-$PO_4$, 2 ppm PBTC)<br>150 ppm polymeric stabilizing agent<br>(15 ppm terpolymer*, 4.2 ppm TT)<br>30 ppm molybdate |

*terpolymer of acrylic acid, methacrylic acid, and n-tertiary butylacrylamide

Pot heater tests were conducted to test each of the treatment compositions. A stainless steel pot heater, possessing a capacity of approximately 9–10 liters, was utilized to simulate higher water temperature. The unit circulates water over a standard mild steel tube which is heated using a 1000 watt heater. The bulk water temperature was maintained at 170°–180° F. The test period was one week. The test water contained 150 ppm $Ca^{+2}$ and 75 ppm $Mg^{+2}$ (both as ppm $CaCO_3$); and 100 ppm $HCO^{-1}$ (as ppm $CaCO_3$) was added to the test water to increase the total alkalinity to 200 (as ppm $CaCO_3$). Initial and final samples of the test solution were analyzed. The mild steel tube was weighed before the test and after the test was completed, the tube was dried in an oven and reweighed. The tube was then cleaned with acid, dried, and the final weight determined.

The results of the pot heater tests are recorded below in Table 2. Test 2 illustrates the improvement in corrosion inhibition when molybdate is added to the treatment composition. The results of Test 3 indicate that even with the reduction in the concentrations of zinc and orthophosphate, successful corrosion inhibition can be achieved when the treatment composition contains an overlay of molybdate.

TABLE 2

Pot Heater Tests
Bulk Water 170–180° F., Mild Steel Tube

|  | Test 1 | Test 2 | Test 3 |
|---|---|---|---|
| Corrosion Rate (mpy) | 1.2 | 0.6 | 0.7 |
| Deposit Rate (mg/cm² yr) | 30.0 | 14.5 | 15.8 |

EXAMPLE 2

Four different treatment compositions with a molybdate overlay were prepared to demonstrate that successful corrosion inhibition can be achieved despite the lower levels of zinc and orthophosphate. The treatment compositions were prepared as a three component system:

a) the first component is acidic, consisting of $Zn^{+2}$, orthophosphate, and PBTC;

b) the second component is alkaline consisting of the polymer and tolyltriazole; and c) the third component is a molybdate solution. The concentrations of the zinc-orthophosphate programs in Tests 1b and 2b were reduced by one-third. The concentration of molybdate was decreased by one-half in Tests 2a and 2b. Table 3 lists each of the treatment compositions.

Pilot Cooling Tower (PCT) tests were conducted at a basin temperature of 130° F. to test each of the treatment compositions. The PCT test is a dynamic test which simulates many features present in an industrial recirculating cooling water system. The general test method is described in the article "The Design and

TABLE 3

| Test 1a | Test 1b | Test 2a | Test 2b |
|---|---|---|---|
| 10 ppm molybdate | 10 ppm molybdate | 5 ppm molybdate | 5 ppm molybdate |
| 1.5 ppm $Zn^{+2}$ | 1 ppm $Zn^{+2}$ | 1.5 ppm $Zn^{+2}$ | 1 ppm $Zn^{+2}$ |
| 6 ppm o-$PO_4$ | 4 ppm o-$PO_4$ | 6 ppm o-$PO_4$ | 4 ppm o-$PO_4$ |
| 3 ppm PBTC | 2 ppm PBTC | 3 ppm PBTC | 2 ppm PBTC |
| 5 ppm terpolymer* | 5 ppm terpolymer* | 5 ppm terpolymer* | 5 ppm terpolymer* |
| 1.4 ppm TT | 1.4 ppm TT | 1.4 ppm TT | 1.4 ppm TT |

*terpolymer of acrylic acid, methacrylic acid, and n-tertiary butyl acrylamide

Application of Polymers in Cooling Water Programs", E. B. Smyk, J. E. Hoots, K. P. Fivizzani, and K. E. Fulks, CORROSION/88, Paper No. 14, National Association of Corrosion Engineers, Houston, Tex., 1988. The general operating conditions are a basin temperature of 130° F. and a pH range of about 8.0 to 8.5. The recirculating test water contained 120 ppm $Ca^{+2}$ and 60 ppm $Mg^{+2}$ (both as ppm $CaCO_3$).

At the beginning of a PCT test, the mass of each heat exchange tube is determined. After the test is completed, the tubes are dried in an oven and reweighed. The tubes are then cleaned with inhibited acid (dilute HCl and formaldehyde), dried, and the final weight determined. These three weights are used to determine the deposit rates (mg/cm² yr) and corrosion rates (mils per year).

The results of the PCT tests are recorded below in Tables 4 and 5. The effective scale and corrosion inhibition of each treatment composition will be evident to those skilled in the art. Tests 1b and 2b indicate that treatment compositions with a molybdate overlay will achieve successful corrosion inhibition despite the reduction in the concentration of zinc-orthophosphate program by one-third. In addition, Tests 2a and 2b illustrate acceptable results when only one-half the amount of molybdate is added to the treatment composition.

TABLE 4

| Test | Average Deposit Rate (mg/cm² yr) | | |
|---|---|---|---|
| | mild (carbon) steel (n = 3) | admiralty brass (n = 2) | stainless steel (n = 1) |
| 1a | 31.6 | 2.06 | 0.06 |
| 1b | 28.8 | 3.15 | 0.84 |
| 2a | 21.3 | 3.26 | 0.76 |
| 2b | 26.7 | 2.48 | 0.76 |

TABLE 5

| Test | Average Corrosion Rate (mpy) mild (carbon) steel (n = 3) |
|---|---|
| 1a | 0.97 |
| 1b | 1.10 |
| 2a | 0.77 |
| 2b | 1.07 |

While the present invention is described above in connection with preferred or illustrative embodiments, the embodiments are not intended to be exhaustive or limiting of the invention. Rather, the invention is intended to cover all alternatives, modifications and equivalents including within the spirit and scope, as defined by the appended claims.

What is claimed is:

1. A method of treating cooling water systems operating at temperatures in excess of 130° F. with a stabilizing agent which is an anionic polymer, a general corrosion and scale inhibitor comprising zinc, nickel or a combination thereof, orthophosphate, and a 2-phosphonobutane-1,2,4 tricarboxylic acid, in which the level of the general corrosion and scale inhibitor required to achieve a given level of corrosion inhibition in the absence of a localized corrosion inhibitor is reduced by at least one third by introducing a localized corrosion inhibitor chosen from the group consisting of water-soluble salts of molybdenum, vanadium, and tungsten.

2. The method of claim 1 in which the localized corrosion inhibitor is a water-soluble salt of molybdenum.

3. The method of claim 1 in which the stabilizing agent is selected from the group consisting of homopolymers, copolymers, terpolymers which contain at least one mole percent of a randomly repeating or blocked monomer unit having the structure:

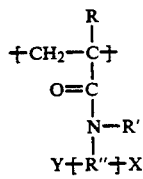

wherein
R is H, CH$_3$, or mixtures thereof;
R' is H, C$_{1-4}$ alkyl, or mixtures thereof;
R'' is alkylene having
from 1-16 carbon atoms, or cyclic, aryl, alkaryl, aralkyl, or mixtures thereof
X is sulfonate, phosphonate, phosphite, or mixtures thereof Y is H, —OH, —NR'$_2$, NR'$_3$$^+$Z$^-$, —CO$_2$M, and mixtures thereof and where Z is an ion, and M is H, alkali cation, alkaline earth cation, ammonium cation, or mixtures thereof.

4. The method of claim 1 in which the stabling agent is a terpolymer of acrylic acid, methacrylic acid, and N-tertiary butylacrylamide.

5. The method of claim 1 in which a corrosion inhibitor for yellow metals, chosen from the group consisting of tolyltriazole and benzotriazole, is introduced.

6. The method of claim 5 in which the corrosion inhibitor for yellow metals in tolyltriazole.

7. The method of claim 1 in which the cooling water systems operate at temperatures in the range of 170°-180° F.

* * * * *